(12) United States Patent
Menachem

(10) Patent No.: US 6,386,488 B1
(45) Date of Patent: May 14, 2002

(54) FASTENING DEVICE FOR INSTALLING GAS OR LIQUID CONDUCTING PIPES

(76) Inventor: Izhack Menachem, Elihou Brown 19, 97296 Jerusalem (IL)

( * ) Notice: Subject to any disclaimer, the term of this patent is extended or adjusted under 35 U.S.C. 154(b) by 0 days.

(21) Appl. No.: 09/555,666
(22) PCT Filed: Nov. 10, 1998
(86) PCT No.: PCT/IL98/00548
§ 371 Date: Jul. 24, 2000
§ 102(e) Date: Jul. 24, 2000
(87) PCT Pub. No.: WO99/28664
PCT Pub. Date: Jun. 10, 1999

(30) Foreign Application Priority Data

Dec. 4, 1997 (IL) ................................................. 122449

(51) Int. Cl.⁷ ................................................. F16L 3/08
(52) U.S. Cl. ........................................ 248/74.2; 248/62
(58) Field of Search .................. 248/74.2, 68.1, 248/74.4, 74.5, 62

(56) References Cited

U.S. PATENT DOCUMENTS

| | | | | | |
|---|---|---|---|---|---|
| 4,360,178 A | * | 11/1982 | Senter et al. | ............... | 248/74.1 |
| 4,417,711 A | * | 11/1983 | Madej | ........................ | 248/62 |
| 4,429,440 A | * | 2/1984 | Laughlin et al. | ............... | 24/486 |
| 4,790,060 A | * | 12/1988 | Council et al. | .......... | 29/525.08 |
| 5,022,614 A | * | 6/1991 | Rinderer | ....................... | 248/62 |

* cited by examiner

Primary Examiner—Anita King
(74) Attorney, Agent, or Firm—Mayer, Brown, Rowe & Maw

(57) ABSTRACT

The present invention relates to a fastening device for installing a gas or a liquid conducting pipe (10), to a lateral supporting track (13) having a transverse cross section shape of inverted U with inwardly bend ends (15, 16) near its opening, comprising: a body made of two substantially identical parts (8) and a bolt (19) for connecting and fastening them to each other at their upper part (17, 18). Each of said identical parts has two parallel side walls (5, 6) which are interconnected only in their upper ends (17, 18) and their bottom ends (4, 9) are free with a gap (7) between them for the passage of the pipe. The two identical parts are connected to each other by adjusting the bolt which passes through a hole (1) in each part. The fastening device, according to the present invention, can be manufactured in many ways, in various sizes, and from various materials, according to the fastening requirements in various systems.

7 Claims, 2 Drawing Sheets

FASTENING DEVICE FOR INSTALLING GAS OR LIQUID CONDUCTING PIPES

FIELD OF THE INVENTION

The present invention relates to a fastening device for installing gas or liquid conducting pipes. More specifically the present invention relates to a fastening device enabling an economical installation of a plurality of parallel pipes usually used in the semiconductors and pharmaceutical industries. In those fields of industry, hundreds of metal gas pipes have to be installed over a limited area. Compared with the conventional art in this field, the new fastening device, according to the present invention, enables the increase of up to 300% in the amount of installed gas pipes in a given area.

BACKGROUND OF THE INVENTION

In many fields of industry, there is a need for installing metal gas pipes between a reservoir of one or more kinds of gas (or liquid), and working emplacements, robots and machines. The production facilities of the semiconductors and pharmaceutical industries extensively utilizes stainless steel piping for the transport of gases and liquids. Via these stainless steel pipes, the various gases and liquids flow from the various chemical systems to the production area in the cleanroom. In such industries, hundreds of pipes are needed and installed along the walls or the ceiling.

Until now, the pipes are installed under the ceiling by securing them to lateral bars which are spaced at intervals along the path of the gas pipes. The lateral bars are fastened to the ceiling or to parallel walls of a corridor, while the gas pipes cross the bars suspended from below and are secured to the bars by clamps. Generally, the piping segments are connected to each other by fastening their ends or welding them. To avoid breakage in either of these connective methods, the requirements from the clamping means are that they secure the pipes to the bars so as to prevent any slight sliding or moving of a pipe in any direction.

The prior art in this field shows a supporting structure made from lateral tracks (bars). Each track is shaped in an inverted U transverse cross section, and all the tracks are attached to walls or ceiling in substantially fixed intervals. The metal gas pipes are secured to the tracks by metal clamps which are inserted into each track according to the number of pipes crossing under the specific track. One clamp for each gas pipe is needed. Each clamp has a closed upper part adapted for insertion into a track, and a lower part with opened tongs adapted to receive a pipe. During the installation procedure, the lower part tongs are closed and tightened over the pipe by a bolt (screw). The bolt passes through holes in the opened tongs, in a transverse direction to the path of the pipe. According to said prior art supporting means, it is possible to install only up to one pipe of a ¼" diameter, per 1.25 inch. Each clamp needs an interval of over 1 inch for securing its bolt or for opening it. Hence, although five ¼" pipes laying beside each other are of a length of 1.25 inch, actually (because of the extra space needed for the bolt) only one pipe may be secured to the track (per 1.25"). Another problem posed by using the prior art supporting means for the insertion (or removal) of a pipe from between the clamp tongs, is that the closing bolt must first be removed.

The fastening device according to the present invention significantly reduces this 1 inch interval between each pair of pipes. In addition, the device may be provided as one unit with its bolt, and there is no need to remove the bolt prior to use.

In order to install many more pipes per given track length unit, there is a need to change the direction of the bolt in each clamp, such that it will have to be secured or opened in the direction of the pipe, instead of in the lateral direction as it is until now. The problem is that in the direction of a pipe the clamp has to be opened in order to receive a pipe. The obliged orientation of such opening, forces a lateral orientation to the tightening bolt which uses to close this opening, fixing the pipe therein. In these circumstances, it seems to be impossible to change this forced lateral orientation of the bolt.

Surprisingly, the present invention solves this problem by inverting both, the direction of the bolt and the direction of the opening of the clamp. The fastening device (clamp) according to this invention is closed from its bottom, and its opening for receiving a pipe is made in the direction of the ceiling. The adjusting bolt is directed along the path direction of the pipe, and the pipe is secured to the fastening device not by the force of the fastening device itself, but by a mutual pressure between the clamp and the track. Furthermore, according to this invention, the same operation which closes the fastening device also secures it to the lateral supporting track. Therefore, the fastening device, according to the present invention, reduces to minimum the required interval between each pair of parallel installed pipes. The only space needed between pipes is equivalent to the width of the side walls of two neighboring fastening devices. By this improvement, the maximum number of installed pipes in a predetermined space, is increased by up to 300%. The benefits are in space conservation, as well as in total length of supporting tracks. In addition, the fastening device and its adjusting bolt may be supplied to the user as a complete unit, for rapid installation procedure. In a single operation, both the fastening device is secured to the supporting track and the pipe is fixed to its place. The adjusting bolt is handled easily, without any interruptions from bolts of neighboring fastening devices. Those advantages save time and money in installation and maintenance procedures.

It is the object of the present invention to provide a fastening device for installing pipes to a supporting track which allows compact installing of pipes with no space between adjacent pipes.

It is another object of the present invention to provide such a fastening device that can be easily installed and easily removed from the supporting track for rapid installation or removing of individual pipes without any need to remove adjacent pipes and that can be easily added (or removed) for the installation of additional pipes at any desired stage.

Yet it is another object of the present invention to provide such a fastening device that can be installed into (or removed from) the supporting track and can accept the pipe (or letting it being removed) without a need to remove the bolt prior to installing the device into the track or prior to accepting the pipe, thus can be the supplied as a one unit and avoids the risk of losing bolts during installation, or of using inappropriate bolts.

SUMMARY OF THE INVENTION

The present invention relates to a fastening device for installing a gas or a liquid conducting pipe, to a lateral supporting track having a transverse cross section shape of inverted U with inwardly bent ends near its opening, comprising: a body made of two substantially identical parts and a bolt for connecting and fastening them to each other at their upper part. Each of said identical parts has two parallel side walls which are interconnected only in their upper ends and their bottom ends are free with a gap between them for the passage of the pipe. Near both said free bottom ends there is a first protrusion in a parallel direction to said passage, both side walls have in a mid portion a second protrusion in a parallel direction to said passage but in the opposite direction of the first protrusion. Above the interconnection area between the side walls there is a hole for inserting the adjusting bolt in a parallel direction to said passage gap, the two identical parts are connected to each other by adjusting the bolt which passes through the hole of each part such that said second protrusion of each side wall of each identical part is facing inwardly and touching and pressed to a corresponding second protrusion of the other identical part creating mutual pivot points between the two identical parts, wherein closing and tightening the adjusting bolt brings the hole of each identical part closer to the other's and simultaneously the first protrusions of each identical part are pushed outwardly and upwardly anchoring the device with the pipe therein to said inwardly bent ends of the lateral track.

The fastening device, according to the present invention, can be manufactured in many ways, in various sizes, and from various materials, according to the fastening requirements in various systems. The fastening device can be further improved by comprising a bulge in an interior side of each of its side walls, such that a slight force is required to bring the device to position on a pipe. This improvement prevents slipping of the device during fastening operation.

The fastening device can be designed such that each of said second protrusions is pointed, or, alternatively, having in each identical part one second protrusion with a slight indentation and another second protrusion with a slight bulge, such that when the two identical parts are in position, facing each other, each pivot point is created by a pair of a bulge of one identical part and a corresponding indentation of the other identical part.

In the context of this invention: "adjusting bolt" includes all its needed paraphernalia (nut, ring, flat washer, lock washer etc.) It also includes a built-in nut in the body of the fastening device, and miscellaneous parts as a spiral spring, if such designed and wanted, etc. and it further includes plurality of adjusting bolts e.g. in a fastening device for a large pipe; "a pipe" includes any intermediate sheath placed between the fastening device and the pipe, or between the pipe and the supporting track, (or both), for securing the pipe, fixing it more firmly or protecting it against damage.

DETAILED DESCRIPTION OF THE INVENTION

The present invention will be further described and clarified in detail by FIGS. 1–6. These figures are solely intended to illustrate the preferred embodiment of the invention and are not intended to limit the scope of the invention in any manner.

FIG. 1 describes an isometric view of one of the two identical parts which the body of the fastening device comprises.

FIGS. 2–4 describe in side views (combined with partial cross-sections) three different states of the complete fastening device in position, with a pipe therein, and a transverse cross section of a supporting track.

Figure 1:
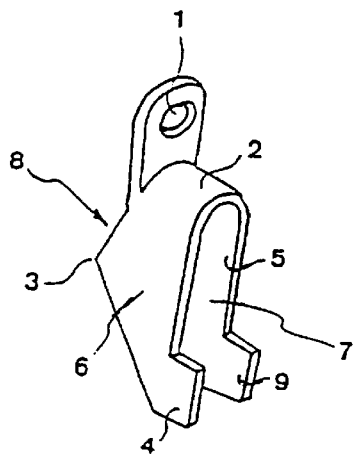

FIG. 1 describes an isometric view of one (8) of the two identical parts comprising the body of the fastening device. This part (8) has two side walls (5)(6) that are spaced from each other by a gap (7), and connected at their apex (2) with an appropriate arch, creating a passage (7) for receiving a pipe having a similar diameter. A hole (1) for receiving an adjusting bolt, is made at the upper part above said connecting arch. The hole (1) is made in the same direction of the passage (7), such that an adjusting bolt can be inserted through the hole, along the same path of the received pipe. The part (8) further has two first protrusions (4)(9) for anchoring to a corresponding supporter (track), and two second protrusions (3) (in this figure the other second protrusion is hidden by the side wall (6)), for facing and being pressed to corresponding second protrusions of the other identical part. Such two identical parts are connected to each other by means of an adjusting bolt inserted through the hole (1) of each part. They are connected face to face such that the second protrusions (3) become a pivot point to the tightening force of the adjusting bolt, which acts between the upper parts of both units.

Figure 2:
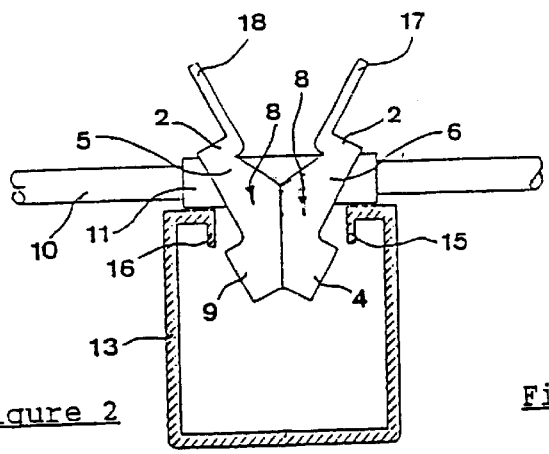
Figure 3:
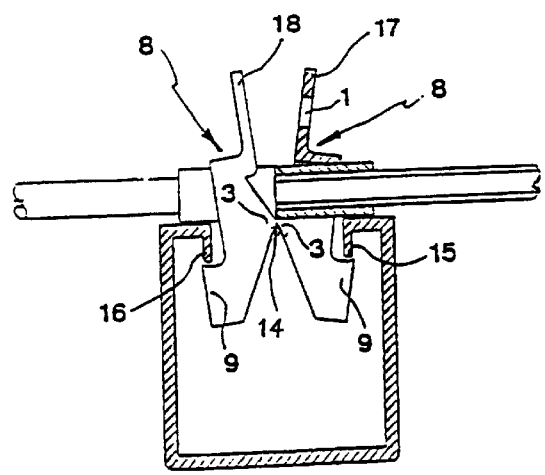
Figure 4:
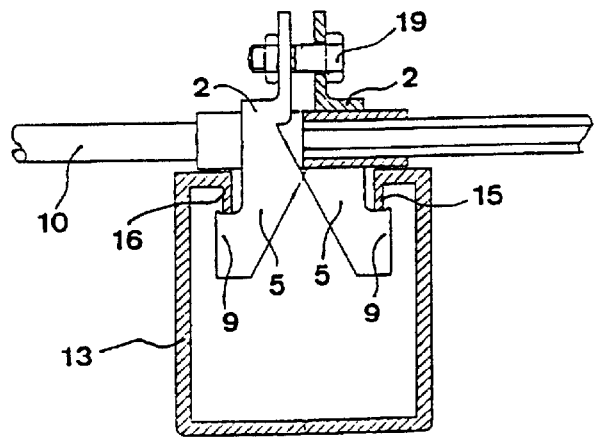

FIGS. 2–4, describe in side views combined with side cross-section views, three different states of the complete fastening device, with a pipe therein, and a transverse cross section of a supporting track.

Figure 2A:
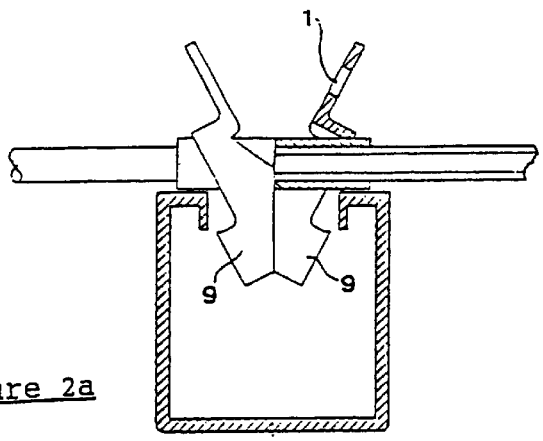

FIG. 2 shows a pipe (10) protected by a section of protective sheath (11), positioned through a passage gap of two identical parts (8) facing each other. The pipe is found between the track (13) and the closed apex (2) of the side walls (5)(6) of the two identical parts. In this figure the fastening device is completely opened. This is a correct position for inserting the free ends of the identical parts (with the first protrusions (4)(9)) into the space of the supporting track. FIG. 2a differs from FIG. 2 only in including a cross section of one of the identical parts. In this cross section the hole (1) is seen, and the second protrusion (9) of the crossed identical part (which is now not hidden by the side wall (6)) is seen. In FIG. 3, the two identical parts (8) are turned around pivot point (14) created by the second protrusions (3) of the identical parts, such that the first protrusions (4)(9) come closer to the inwardly bent protrusions (15)(16) of the supporting track (13). At the same time, the upper parts (17)(18) of the identical parts come closer to each other, such that a short adjusting bolt can be inserted through the hole (1) in said upper parts.

FIG. 4 shows the fastening device after inserting and tightening of the adjusting bolt (19). The first protrusions (4)(9) of the identical parts (8) are now anchored to the track by means of its inwardly bent protrusions (15)(16), and the pipe (10) is trapped and tightened between the track (13) and the apexes (2) of the side walls (5)(6) of the identical parts. In this figure, it is clearly depicted that the adjusting bolt (19) is parallel to the pipe (10).

Figure 5:
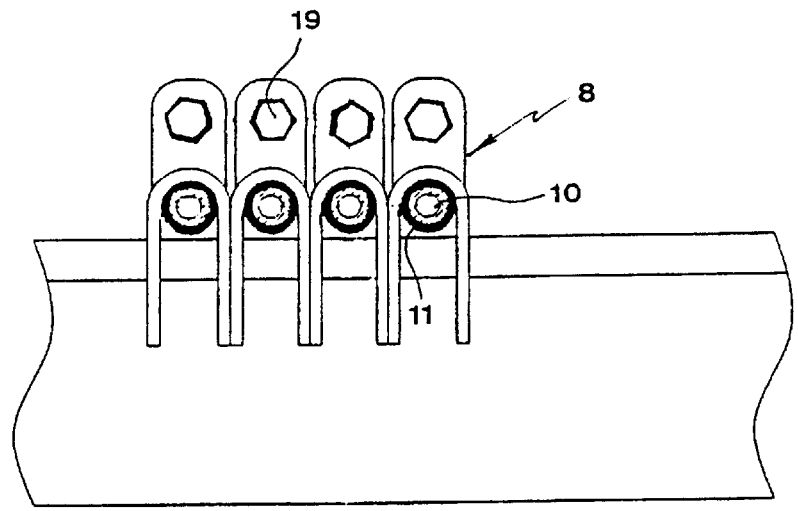
FIG. 5 shows a transverse cross section of four pipes fastened by four fastening devices.

FIG. 5 shows a cross section of four pipes (10) fastened by four fastening devices (8). The gas (or liquid) pipes are spaced from each other only by a small gap resulted from the wall widths of each two neighboring fastening devices. Although the fastening devices are very close to each other it can be clearly realized that there is no problem in separately opening any wanted adjusting bolt (19) for releasing its associated fastening device (and pipe).

Figure 6:
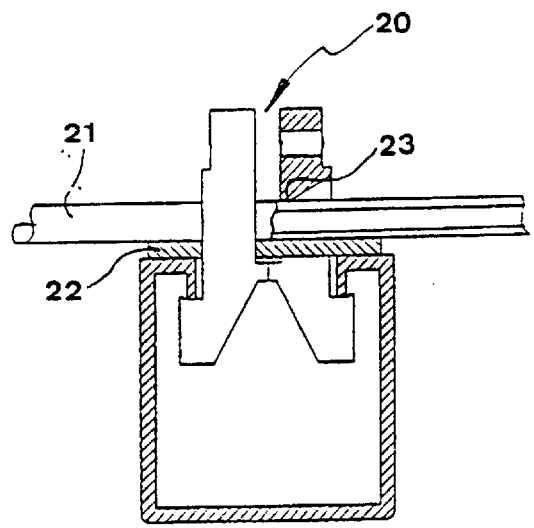
FIG. 6 shows another kind of fastening device according to this invention.

The fastening device, according to the present invention, may be designed in various shapes, resulted from its various possible production methods, and its various uses. For example, the exact pressing region of the fastening device upon a pipe is a matter of design. FIG. 6 describes another embodiment of the fastening device of this invention. As can be seen in the cross section (right side of this figure), the pressing area (23) of the fastening device (20) upon the pipe, is near the center of the fastening device. In the preceding figures, the pressing area is wider, and is extended along the entire apex of the passage gap of each identical part. There are also other minor differences between the shapes and designs of the two embodiments (those of FIGS. 1–5, and this of FIG. 6) The fastening device of FIG. 6 is made of a molded plastic composition. When using this kind of fastening device, there is no need to protect the pipe (21) from the relatively soft material of the fastening device itself. Therefore, the pipe is only protected on that side which faces the track, by a piece (22) of relatively soft material placed between the metal track and the pipe.

The protective sheath (11) of FIG. 2, and the piece (22) of soft material of the present FIG. 6, may be designed with integral flexible clamping means for being either locked to the supporting track or inserted and attached to a pipe, prior to securing the pipe with the fastening device. (They can also be supplied as an accessory with each fastening device). For example, the clamping means of said protective sheath, may be one split or cut along the sheath, which enables to arrange it in a middle of a pipe, making use of the self flexibility of the sheath. The piece (22) may be further provided on each of its ends with one integral C-shape clamp with its opening facing the pipe and locked to it, prior to fastening it. In another variation the piece (22) can be provided with appropriate protrusions facing the side walls of the supporting track (from their outer side) or facing the inwardly bent protrusions of the supporting track (through the track opening), and adapted to be held to the track, due to a slight pressure created between the track and the protrusions.

What is claimed is:

1. A fastening device to install a gas or a liquid conducting pipe (10) to a lateral supporting track (13) having a transverse cross section shape of inverted U with inwardly bent ends (15,16) near an opening thereof, comprising:

a body made of two substantially identical parts (8), each having a hole (1) in an upper part (17) for inserting a bolt, and a bolt (19) for connecting and fastening said substantially identical parts (8) to each other at their upper part, wherein each of said substantially identical parts comprises:

two parallel side walls (5,6) which are interconnected only in their upper ends thereof to define an interconnection area and having bottom ends free, with a gap (7) between said bottom ends defining a passage for the pipe, and wherein the hole for inserting the bolt is located above the interconnection area (2) such that the bolt is inserted in a parallel direction to said passage; and near both free bottom ends, a first protrusion (9) in a parallel direction to said passage, and both side walls have in their mid portion a second protrusion (3) in a parallel direction to said passage but in the opposite direction of the first protrusion; and when the two identical parts (8) are connected to each other by inserting the bolt (19) through the hole (1) of each part, the second protrusions (3) of each identical part are pressed against the corresponding second protrusions of the other identical part, creating mutual two pivot points between the two identical parts, and upon tightening the bolt, the upper parts (17) of the identical parts are brought closer to each other and simultaneously the first protrusions (9) of each identical part are pushed outwardly and upwardly, anchoring the device with the pipe therein to the inwardly bent ends of the lateral track.

2. A fastening device according to claim 1 further comprising in an interior side of each side wall a bulge such that bringing the device to position on said pipe requires a slight pressure, for preventing a slipping of the device during the fastening operation.

3. A fastening device according to claim 1 wherein each second protrusion is pointed.

4. A fastening device according to claim 1 having in each identical part one second protrusion with a slight indentation and another second protrusion with a slight bulge, such that when the two identical parts are in position, facing each other, each pivot point is created by a pair of a bulge of one identical part and a corresponding indentation of the other identical part.

5. A fastening device according to claim 1 further comprising at said passage an intermediate sheath for protecting the pipe or to allow fixing said pipe more firmly.

6. A fastening device according to claim 5, wherein the intermediate sheath is adapted to be held to the pipe or to the supporting track, prior to fastening the pipe.

7. A method for the preparation of a fastening device as defined in claims 1–6 by casting, press forming, bending, or shaving process.

* * * * *